US004001771B2

United States Statutory Invention Registration [19]

[11] Reg. Number: H1771

Choi et al. [45] Published: Jan. 5, 1999

[54] COUPLED CAVITY GYROTRON-TRAVELING-WAVE-TUBE AMPLIFIER

[76] Inventors: Jin Joo Choi, 11113 Captains Walk Ct., North Potomac, Md. 20878; Carter M. Armstrong, 23174 Providence Dr., Kildeer, Ill. 60047; Gunsik Park, Boxd 2208, Yale Station, New Haven, Conn. 06520

[21] Appl. No.: 757,617

[22] Filed: Nov. 29, 1996

[51] Int. Cl.[6] ..... H01J 25/00

[52] U.S. Cl. ..... 330/45; 315/5; 315/5.39

[58] Field of Search ..... 315/3.5, 4, 5, 5.39; 330/43, 45

[56] References Cited

U.S. PATENT DOCUMENTS

| | | | |
|---|---|---|---|
| 3,346,819 | 10/1967 | Birdsall | 330/45 X |
| 3,441,783 | 4/1969 | Harris et al. | 315/3.5 |
| 3,457,450 | 7/1969 | Feinstein et al. | 315/5 |
| 4,004,180 | 1/1977 | Gross | 315/3.5 |
| 4,129,803 | 12/1978 | Friz | 315/3.5 |
| 5,391,963 | 2/1995 | Allen et al. | 315/3.5 |
| 5,402,032 | 3/1995 | Allen et al. | 315/3.5 |
| 5,422,596 | 6/1995 | Armstrong et al. | 315/5 X |

OTHER PUBLICATIONS

Chy, K.R. et al; "Characteristies and Optimum Operating Parameters of a Gyrotron Travelling Wave Amplifier"; *IEEE Trans of Microwave Theory & Technique*; vol. MTT27, No. 2; Feb. 1979, pp. 178–187.

Shively, J.F. et al; "Developement of a 200KW, 60 GHz Gyrotron"; *Int'l Electron Devices Meeting*; Washington D.C. 7–9 Dec 1980; pp. 186–188.

*Primary Examiner*—Daniel T. Pihulic

[57] ABSTRACT

The present invention is a coupled cavity gyrotron-traveling-wave-tube amplifier which produces highly efficient, broad band millimeter wave radiation. The present invention comprises an electron gun, a double ridged coupled cavity interaction circuit and a beam collector. In operation the gun injects a gyrating electron beam through a beam tunnel of a side wall of the coupled cavity. When the electron beam phase is synchronized with the rf phase of the transverse electric mode in the coupled cavity circuit, the electron beam is modulated and amplifies the rf input signal through the negative mass instability called electron cyclontron instability. The coupled cavity design of the interaction circuit effctively slows the rf-wave velocity, allowing amplification of the rf- wave over a broad band. This t ype of broad band microwave energy is highly useful in radar, communications and jamming technology.

1 Claim, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

COUPLED CAVITY GYROTRON-TRAVELING-WAVE-TUBE AMPLIFIER

BACKGROUND OF THE INVENTION

The present invention relates to traveling wave tube amplifiers (TWT Amplifiers) in general and in specific to a coupled cavity gyrotron-traveling-wave-tube amplifier for producing highly efficient, broad band millimeter wave radiation.

Many of today's high-tech military and commercial applications require a high power, broadband radiation source in the millimeter wave frequency range. Military applications for such TWT amplifiers include, but are not limited to, high resolution radar, communications and electronic jamming equipments. Commercial applications include, but are not limited to, equipment for high resolution airborne and shipboard navigation and communication systems, high efficiency satellite communications systems, millimeter-wave material processing, millimeter wave imaging systems and radiation source for laboratory test and measurement to name a few. Light weight, compact design and low cost are also critical factors for practical use and commercial production.

The use of free electron beams, linear and rotating, in vacuum tubes has been successful in producing multi-kilowatt high power, broadband radiation. Tens of kilowatts power in the millimeter wave frequency range with a large bandwidth, operating at a low beam voltage (<60 kV ) is more attractive in today's TWT community.

Conventional approaches for achieving broadband rf amplification in the linear beam TWT-amplifiers are the use of a helix circuit supported by dielectric rods, an E-plane bend folded waveguide or the use of a staggered ladder circuits.

Millimeter wave helix circuits are generally too small to handle high peak and average power radiation. In both the ladder circuit and the folded waveguide, since the beam tunnel size is directly related to beam wave interaction impedance, the amount of beam power which can be injected into the circuit is limited by the small beam tunnel size. The radiation electronic efficiency of the linear beam devices in general is not more the 10%.

Until now approaches for attaining broadband rf amplification in the conventional gyro-TWT amplifiers have involved either loading disks, or dielectric material, into the waveguide to slow down the rf phase velocity of the wave, or tapering both the waveguide and the external magnetic field along the axial distance. In general, the gyro-devices are not suitable for high power, broadband millimeter wave radiation sources, due to the complexity of the circuit, the high magnetic field required, and the lengthy circuit.

SUMMARY OF THE INVENTION

Accordingly it is an object of the present invention to provide a coupled cavity gyrotron TWT amplifier which produces efficient, broadband, millimeter wave radiation.

It is also an object of the present invention to provide a coupled cavity gyro-TWT device which allows the natural separation of beam and rf applicable for depressed collector operation.

It is also an object of the present invention to provide a coupled cavity gryo-TWT device which has high power handling capability.

It is also an object of the present invention to provide a coupled cavity gyro-TWT amplifier which features a large beam tunnel for high power beam injection with little distortion of the waveguide field structure.

It is also an object of the present invention to provide a coupled cavity gyro-TWT amplifier which is robust and easy to fabricate.

It is also an object of the present invention to provide a coupled cavity gyro-TWT which offers simplicity of coupling and severing.

It is a further object of the present invention to provide a coupled cavity gyro-TWT device with a compact design.

The present invention comprises an electron gun, a double ridged coupled cavity interaction circuit and a beam collector. In operation the gun injects a gyrating electron beam through a beam tunnel of a side wall of the coupled cavity. When the electron beam phase is synchronized with the rf phase of the transverse electric mode in the coupled cavity circuit, the electron beam is modulated and amplifies the rf input signal through the negative mass instability called electron cyclotron instability. The coupled cavity design of the interaction circuit effctively slows the rf-wave velocity, allowing amplification of the rf- wave over a broad band. This type of broad band microwave energy is highly useful in radar, communications and jamming technology.

DETAILED DESCRIPTION OF THE INVENTION

Figure 1:
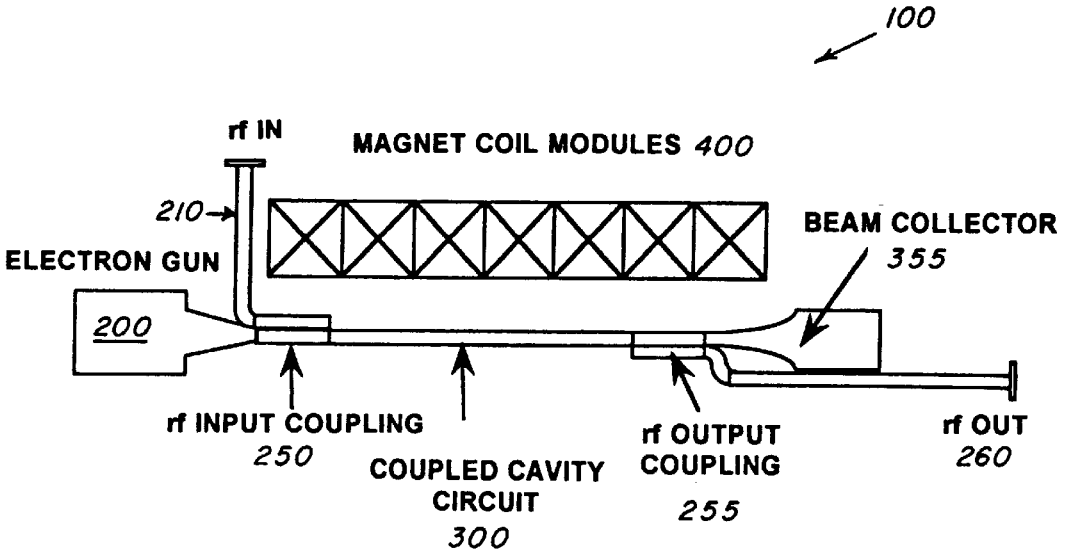
FIG. 1 is a diagram of the basic architecture of the coupled cavity gyrotron traveling wave tube amplifier.

Referring now to the figures wherein like reference characters indicate like elements throughout the several views, FIG. 1 illustrates a block diagram of the basic architecture of the coupled cavity traveling wave tube amplifier 100. Electron gun 200 injects a gyrating electron stream into coupled cavity interaction circuit 300 through rf input coupling 250. An rf-source (not shown), provides rf-energy (rf-wave) which is injected into rf-input guide 210. The rf-energy propagates through guide 210 an into rf-input coupling 250 from where the rf-energy is also injected into interaction circuit 300. The rf-energy and the gyrating electronic stream then copropagate through interaction circuit 300, the gyrating electron stream and the rf-wave interacting as both travel the length of interaction circuit 300. Interaction circuit is oriented so that the electric field of the rf-wave is perpendicular to the propagation direction of the gyrating electron stream. A magnetic field across the gun 200, interaction circuit 300, and couplings 250, 255, is produced by magnetic coil module 400 which encircles the system 100. The magnetic field is used to position the gyrating electron stream to ensure coupling of the gyrating electric stream and the rf-wave over a broad band. When the gyrating electron stream and the rf wave couple, the electron stream's transverse momentum transfers energy to the rf-wave resulting in a net gain in the rf-energy through the phenomena known as electron cyclotron instability. The coupled cavity design of interaction circuit 300 which slows the phase velocity of the rf-wave and the magnetic field which positions the gyrating electron stream provide the necessary coupling between the electron beam velocity and rf-wave's transverse electric field, in order to allow the transverse electric field and the gyrating electric stream to interact over a wide band. The electron stream then passes through rf-output coupling 255 and is collected by depressed beam collector 355, while the amplified rf-wave passes through rf-output coupling 255 and propagates through rf-output waveguide 260.

Figure 2:
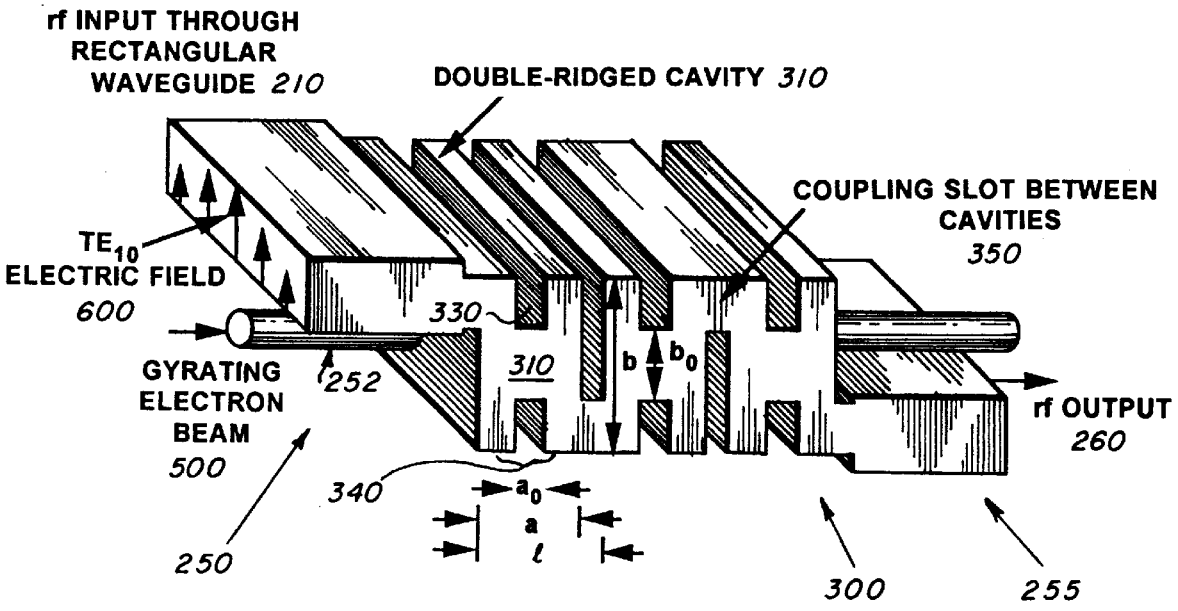
FIG. 2 is a diagram of one section of the coupled cavity circuit.

FIG. 2 shows a detailed illustration of interaction circuit 300. Interaction circuit 300, features a coupled cavity structure, comprising rectangular cavities 310 which feature ridges 330 which protrude into the cavity 310. The ridged cavities 340 are connected through coupling slots 350 which may be arranged in a staggered or other configuration but must couple the inner volume of ridged cavities 310 to allow propagation of the rf-wave 600 and gyrating electron stream 500 through interaction circuit 300. The rectangular cavities 310 which form interaction circuit 300 support a $TE_{10}$ like mode of rf wave 600, and unlike conventional linear beam coupled cavity devices, is oriented so that the electric field of the $TE_{10}$ like mode 600 is perpendicular to the propagation direction of electron beam 500. TE wave 600 propagates through alternating rectangular coupling slots 350, placed in the side wall of cavities 310. A finite element code HFSS, is used to increase the accuracy of predicting of the wave dispersion characteristics in periodic coupled cavity circuits and allows the structural design to be tailored to maximize bandwidth (*Hewlett Packard High Frequency Structure Simulator Reference,* Santa Rosa, Calif. (1992)). The cavity resonant frequencies are found in a closed cavity structure to predict the dispersion characteristics of each coupled cavity structure. Each peak represents a phase shift per cavity which may be expressed as:

$$k_{\|}l = \frac{p\pi}{(N_c + 1)} \tag{1}$$

where $k_{\|}$ is the axial propagation constant, p=1, 2, 3, . . . , $N_c$, and $N_c$ is the number of cavity 310 forming interaction circuit 300 and l is the distance defined by the combined length of the structure defined by cavity 310 and coupling slot 350.

When a beam cyclotron mode, is tuned to be synchronized with the rf-wave dispersion, the electron cyclotron instability will take place. This relationship may be expressed as follows:

$$\omega = \frac{\Omega_c}{\gamma} + k_{\|}v_{\|} \tag{2}$$

for the gyrating electron stream where $\Omega_c$ is the magnetic field frequency, $\gamma$ is the relativistic factor, $k_{\|}$ is the axial propagation constant, and $v_{\|}$ is the beam axial velocity. The rf-wave dispersion may be expressed as:

$$\omega^2 = \omega_{co}^2 \leftrightarrows (k_{\|}c)^2 \tag{3}$$

where $\omega_{co}$ is the lower rf-cutoff frequency and c is the speed of light in a vacuum.

Figure 3:
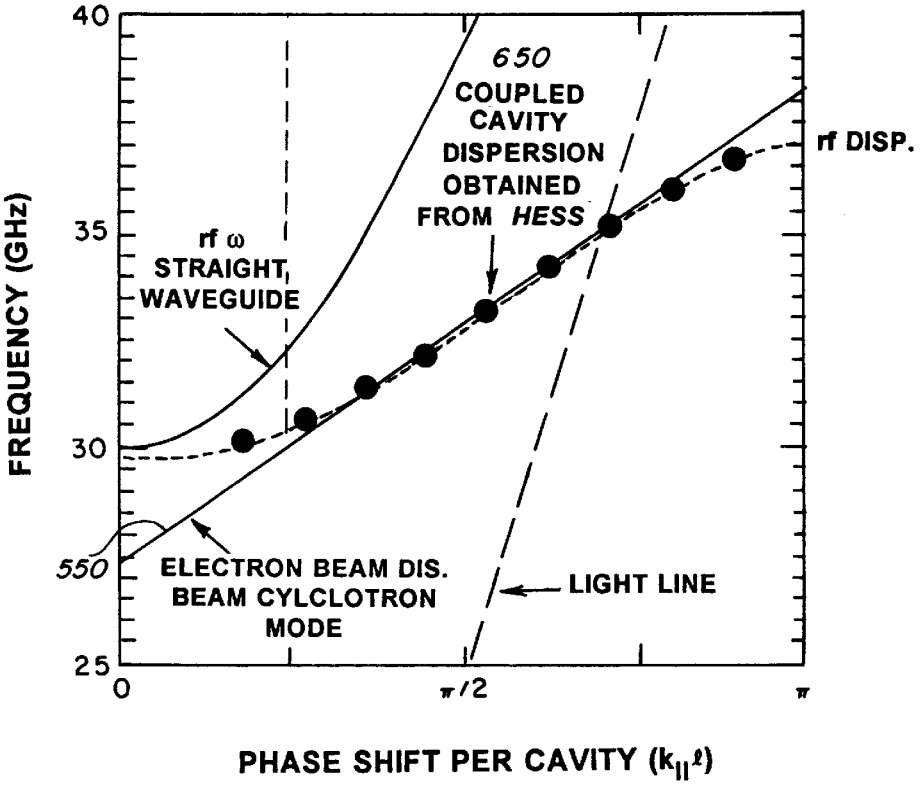
FIG. 3 is a graph of the dispersion relations (frequency vs. phase shift per cavity) of the coupled cavity circuit.

Referring to FIG. 3 which shows a graph of the dispersion relation of an example coupled cavity circuit constructed in accordance with FIG. 2. The code predicted wave dispersions as plotted are $a_c/a$=0.3, $b_c/a$=0.5, b/a=1.6, l/a=1.2, where a=0.254 cm. The first stop-band in the periodic structure illustrated in FIG. 3 is found at ~37 GHz, where the rf-phase shift per cavity becomes Y. When gyrating electron beam 500, is tuned to be synchronized with the rf-wave dispersion in accordance with the parameters set fourth in expression 2, the electron cyclotron instability occurs resulting in a gain realized by rf-wave 600. The reader should note that in FIG. 3, the cyclotron beam mode 550 is nearly tangential to the rf-wave dispersion 650 over the bandwidth of 20% indicating electron cyclotron instability will occur over that bandwidth thus allowing wideband rf amplification.

Again referring to FIG. 2 a detailed view of rf input coupling 250 is illustrated. Input coupling 250 comprises wave guide 210 and electron beam tunnel 252. Wave guide 210 injects the rf wave into coupled cavity 310 which defines the front end of interaction circuit 300. Electron beam tunnel 252 is coupled to said coupled cavity 310 with the beam tunnel hole located on the wall of coupled cavity 310. In a preferred embodiment, electron beam tunnel 252 is located at the point on the wall with the minimum electric field. By locating the electron beam tunnel 252 at the point on cavity 310 with the least electric field the beam tunnel sized does not perturb or distort the rf wave. This structural feature allows the size of the beam tunnel to be increased enabling one to use a higher power gyrating beam without negatively affecting the rf wave, thus allowing the coupled cavity structure to have a higher power handling capabilities than traditional TWT structures.

The coupled cavity structure of interaction circuit 300 also allows for the natural separation of the rf wave 600 and gyrating electron stream 500 at rf output coupling 255 since the rf wave 600, unlike the gyrating electron stream 500, will be deflected by coupling slots 350 propagating along the path defined by the coupled cavity circuit 300. The gyrating electron stream 500 will, in general, propagate straight through the coupled cavity circuit 300 predominately along direction defined by the beam tunnel 252, thus allowing rf-wave 600 to be separated from the electron stream 500 by rf-output waveguide 260.

As rf wave 600 and gyrating beam 500 at times copropagate through interaction circuit 300, the interaction of rf-wave 600 and electron beam 500 cause rf-wave 600 to experience gain through electron cyclotron instability.

Figure 4:
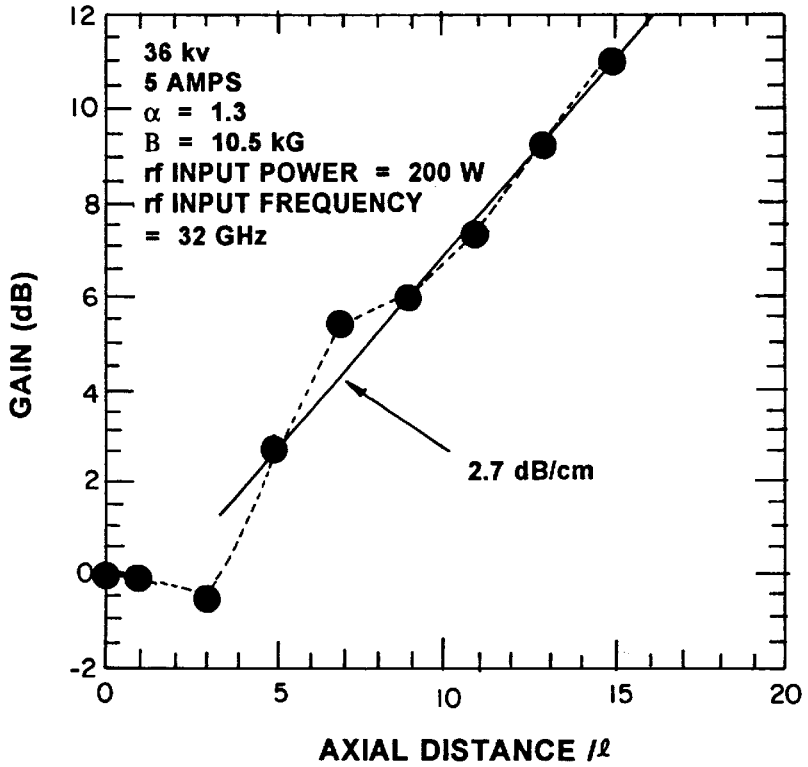
FIG. 4 is a graph of the gain as a function of axial distance.

The SOS code, a fully relativistic three dimensional particle-in-cell (PIC) code, is used to examine beam-wave interaction of the coupled cavity gyro-TWT. Referring now to FIG. 4, which shows a graph of amplifier gain as a function of axial distance, the radiation power is measured in the coupling slot between cavities 350. In practice rf input and output couplings 250, 255 are optimized, by inserting a capacitive iris window between rectangular waveguide 210 and the first cavity, in order to match wave impedance. In the graph labeled as FIG. 4, the rf input frequency is 32 GHz, with a rf-drive power of 200 W. A transverse to parallel velocity ratio, $\alpha$, of 1.3, a grazing magnetic field of 10.5 kG, and a cold gyrating beam of 36 kV at 5A are assumed. An rf launching loss is clearly seen near the third cavity and the rf power linearly increases along the axial distance. The axial growth rate of ~2.7 dB/cm is calculated, which is comparable to or higher than that of a conventional gyro-TWT device. The maximum gain at the fifteenth cavity is 11 dB, corresponding to the radiation power of 2.5 kW and an efficiency of 1.4%. Note that, as shown in FIG. 4, there is no indication of amplifier saturation. Higher gain and efficiency are realized when the number of cavity 310 increases. Single mode amplification is confirmed from frequency measurements and transverse field profiles.

Figure 5:
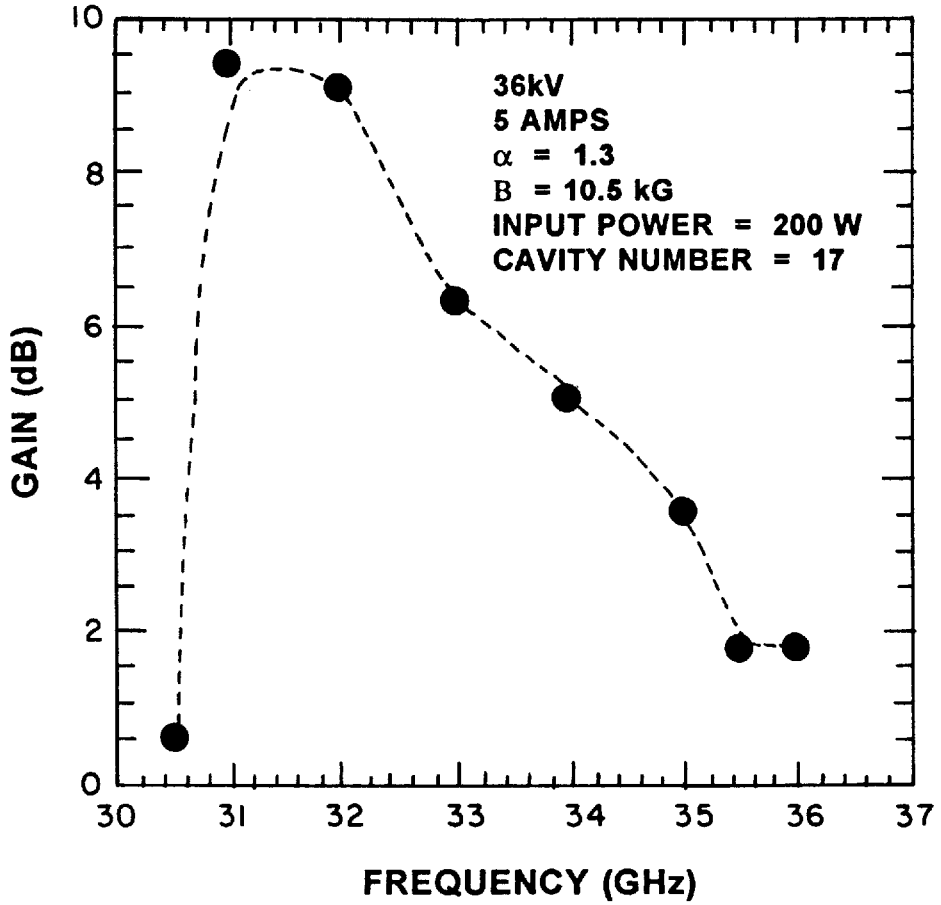
FIG. 5 is a graph of the gain as a function of frequency.

The device is simulated for different input frequencies in order to obtain the instantaneous bandwidth of the device, where all the input parameters are kept same a before except the drive frequency. Referring now to FIG. 5, which is a graph of the amplifier gain as a function of rf freqency, the rf gain is high near the cutoff frequency and it falls of very rapidly as the drive frequency is far from the cutoff frequency. Slow time scale non-linear simulations on the folded waveguide gyro-TWT's reveal similar roll off. In general, the amplifier gain at the circuit length below the saturation length significantly varies in frequency. Therefore, the hot bandwidth at the saturated circuit length of the coupled cavity gyro-TWT is broader than that illustrated in FIG. 5.

The use of dual coupling slots between cavities allows the coupled cavity gyroTWT to operate over an even wider bandwidth. This wider bandwidth is attained by placing two coupling slots between cavities rather than a single slot. The dual slotted design allows rf- wave to propagate through the interaction circuit at a slightly higher group velocity. The higher rf-group velocity allows coupling of the rf-wave and the electron beam over a greater frequency range thus allowing amplification over a broader band. The reader should note that in a dual slotted configuration a higher beam voltage is necessary for the grazing condition to exist over the wide frequency range, because the rf-wave phase velocity of the wave propagating through the dual slotted circuit increases compared with that of the circuit. with single coupling slots.

The interaction circuit and couplings are preferably constructed of oxygen free high conductivity copper, however other metals and/or alloys are suitable.

This new type of transverse coupled cavity circuits, employed with the gyrating electron beam produces higher power broadband millimeter wave radiation. The non-linear PIC code simulation predicts an axial growth rate of 2.7 dB/cm and an unsaturated gain of 9–11 dB. By increasing the number of cavity, it is expected to saturate the device with higher gain and efficiency.

The foregoing descriptions of the embodiments are intended to be illustrative and not limiting. The present invention is applicable to any system which requires efficient amplification of electromagnetic waves. Obviously, numerous modifications and variations of the present invention are possible in light of the above teachings without departing from the spirit of scope of the present invention.

We claim:

1. A Gyrotron Traveling Wave Tube Amplifier comprising:

a coupled cavity circuit having a front and a back;

means for coupling an rf signal and an electron beam to said coupled cavity circuit, said coupling means attached to said front of said coupled cavity circuit, said coupling means recieving said rf signal and said electron beam said rf signal and said electron beam being coupled as said electron beam and rf signal copropagate therethrough;

means to decouple said rf signal and said electron beam, said decoupling means attached to said back of said coupled cavity circuit, said decoupling means recieving said coupled electron beam and said rf signal from said coupled cavity circuit and decoupling said rf signal from said electron beam causing said rf signal to propagate therethrough;

wherein said rf signal and electron beam interact as they propagate through said coupled cavity circuit resulting in the amplification of said rf signal.

* * * * *